United States Patent
Hicks et al.

(10) Patent No.: US 9,152,321 B2
(45) Date of Patent: Oct. 6, 2015

(54) TOUCH SENSITIVE UI TECHNIQUE FOR DUPLICATING CONTENT

(71) Applicant: barnesandnoble.com llc, New York, NY (US)

(72) Inventors: Kourtny M. Hicks, Sunnyvale, CA (US); Amir Mesguich Havilio, Palo Alto, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 166 days.

(21) Appl. No.: 13/886,772

(22) Filed: May 3, 2013

(65) Prior Publication Data

US 2014/0331158 A1    Nov. 6, 2014

(51) Int. Cl.
   *G06F 3/0488*   (2013.01)
   *G06F 3/041*    (2006.01)
   *G06F 3/0486*   (2013.01)

(52) U.S. Cl.
   CPC ............ *G06F 3/04883* (2013.01); *G06F 3/041* (2013.01); *G06F 3/0486* (2013.01)

(58) Field of Classification Search
   None
   See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,545,669 B1 * | 4/2003 | Kinawi et al. | 345/173 |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — David D Davis
(74) *Attorney, Agent, or Firm* — Finch & Maloney PLLC

(57) ABSTRACT

Techniques are disclosed for providing a duplicate content mode in touch sensitive computing devices. The duplicate content mode can be used to copy content or objects to a target location using a multiple contact point drag and drop gesture. For example, the duplicate content mode may be used to copy files from a first folder to a second folder. In some cases, the duplicate content mode drag and drop gesture is initiated using multiple contact points, such as two or more fingers, but may transition to a smaller number of contact points, such as one finger, once initiated. In some cases, the user may be able to select additional content after initiating the drag and drop gesture. Once the content has been copied to the target location, the user can then share or organize the content to the users liking.

20 Claims, 9 Drawing Sheets

(56) References Cited

U.S. PATENT DOCUMENTS

| | | | |
|---|---|---|---|
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2007/0047002 A1 | 3/2007 | Hull et al. | |
| 2008/0036747 A1 | 2/2008 | Hope | |
| 2009/0315847 A1* | 12/2009 | Fujii | 345/173 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0181524 A1* | 7/2011 | Hinckley et al. | 345/173 |
| 2011/0185299 A1* | 7/2011 | Hinckley et al. | 715/769 |
| 2011/0185300 A1* | 7/2011 | Hinckley et al. | 715/769 |
| 2011/0185318 A1* | 7/2011 | Hinckley et al. | 715/863 |
| 2011/0258542 A1 | 10/2011 | Kenney et al. | |
| 2012/0056821 A1 | 3/2012 | Goh | |
| 2012/0084694 A1* | 4/2012 | Sirpal et al. | 715/769 |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0289290 A1* | 11/2012 | Chae et al. | 455/566 |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0024821 A1* | 1/2013 | Lee | 715/863 |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, KIRUPA.COM, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flip-

(56) References Cited

OTHER PUBLICATIONS ping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

"explaining how the sPen tech works (and is very diff than other styluses)," http://forum.xda-developers.com/showthread.php?t=, 1 page, printed from the Internet on Jan. 15, 2013.

\* cited by examiner

Dragged Content Dropped in Target Location by Releasing Contact

Contact Points Released

Dropped Content Copied to Target Location (i.e., Folder 2)

Duplicated Content

Selected Content Dragged to Target Location (i.e., Folder 2)

Dragged Content Dropped in Target Location by Releasing Contact

Contact Point Released

Dropped Content Copied to Target Location (i.e., Folder 2)

Duplicated Content

TOUCH SENSITIVE UI TECHNIQUE FOR DUPLICATING CONTENT

FIELD OF THE DISCLOSURE

This disclosure relates to computing devices, and more particularly, to user interface (UI) techniques for interacting with touch sensitive devices.

BACKGROUND

Touch sensitive computing devices such as smart phones, eReaders, tablet computers, personal digital assistants (PDAs), and other such devices are commonly used for displaying consumable content. The content may be, for example, an eBook, an online article or website, images, documents, a movie or video, or a map, just to name a few types. Such display devices are also useful for displaying a user interface that allows a user to interact with the displayed content. The user interface may include, for example, one or more touch screen controls and/or one or more displayed labels that correspond to nearby hardware buttons. The user may interact with the touch sensitive device using fingers, a stylus, or other implement. The touch screen display may be backlit or not, and may be implemented for instance with an LED screen or an electrophoretic display. Such devices may also include other touch sensitive surfaces, such as a track pad (e.g., a capacitive or resistive touch sensor) or touch sensitive housing (e.g., an acoustic sensor).

DETAILED DESCRIPTION

Figure 1A:
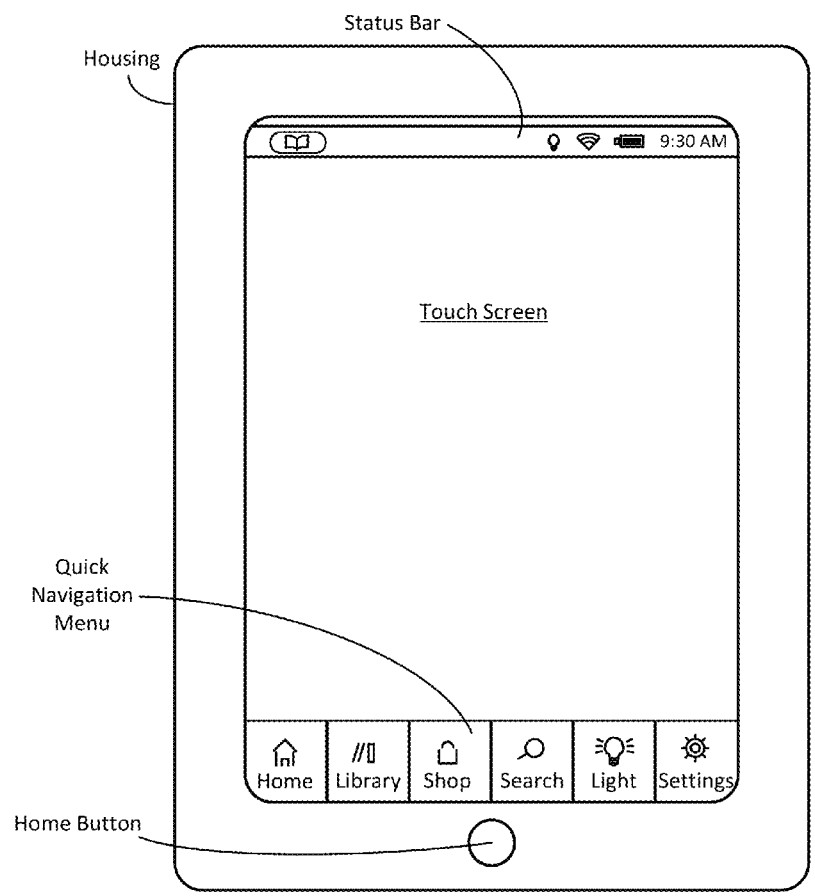
FIGS. 1a-b illustrate an example touch sensitive computing device having a duplicate content mode configured in accordance with an embodiment of the present invention.

Techniques are disclosed for providing a duplicate content mode in touch sensitive computing devices. The duplicate content mode can be used to copy content or objects to a target location using a multiple contact point drag and drop gesture. For example, the duplicate content mode may be used to copy files from a first folder to a second folder. In some cases, the duplicate content mode drag and drop gesture is initiated using multiple contact points, such as two or more fingers, but may transition to a smaller number of contact points, such as one finger, once initiated. In some cases, the user may be able to select additional content after initiating the drag and drop gesture. Once the content has been copied to the target location, the user can then share or organize the content to the users liking. Numerous other configurations and variations will be apparent in light of this disclosure.

General Overview

As previously explained, touch sensitive computing devices such as tablets, eReaders, and smart phones are commonly used for displaying user interfaces and consumable content. In some instances, a user may desire to move content from one location to another, such as moving a file from one folder to another, for example. As a result, some touch sensitive computing devices allow a user to move content by dragging and dropping the content from its original location to the newly desired location. However, in some instances, the user may desire to copy or duplicate the content displayed and/or stored on the touch sensitive computing device to another location, thereby retaining the content in its original location.

Thus, and in accordance with one or more embodiments of the present invention, techniques are disclosed for duplicating or copying content using a multiple contact point drag and drop gesture, referred to collectively herein as a duplicate content mode. As used herein, drag and drop gestures can use any suitable sequence and may include the following sequence: initiate contact (whether direct or proximate) with a touch sensitive surface/interface, drag selected content to a target location (whether the selected content is selected before, during, and/or after initiating contact), drop the content on the target location (e.g., by releasing contact). As previously described, a single-fingered (or a single contact point) drag and drop gesture is recognized by some touch sensitive user interfaces for moving content from one location to another. Using a multi-fingered (or multiple contact point) drag and drop gesture to copy content from one location to another enhances the user experience by providing an intuitive technique for duplicating content on touch sensitive computing devices. The various features of the duplicate content mode described herein may also enhance the user experience. The duplicate content mode is particularly convenient when dealing with touch sensitive devices that use a smaller touch screen and have limited display space, such as smart phones, eReaders, and tablet computers, as will be apparent in light of the present disclosure. The duplicate content mode is primarily described herein with reference to using multiple fingers to perform the drag and drop to copy content techniques. However, the duplicate content mode may be invoked using a stylus or other implement in combination with either at least one other contact point made with the touch sensitive surface/interface (e.g., using a user's finger) or an activated stylus control feature (e.g., a pressed side button), for example.

The duplicate content mode as variously described herein may be used to copy one piece of content or multiple pieces of content. The content may include various objects, such as files, pictures, video content, audio content, books, drawings, messages, notes, documents, presentations or lectures, pages, folders, icons, textual passages, bookmarks, calendar events, contacts, applications, services, and configuration settings, just to name some examples. The content or objects desired to be copied to another location may be selected prior to or during the multi-fingered drag and drop gesture, as will be discussed in turn. For example, if a user desires to copy a group of pictures from their original location to a target location (e.g., from a first folder to a second folder) using the duplicate content mode, the user may, in some cases, select the multiple pictures in the first folder (e.g., using appropriately placed taps) prior to performing a multi-fingered drag and drop gesture to copy the pictures into the second folder. In other cases, the user may select the pictures desired to be duplicated while performing the multi-fingered drag and drop gesture to copy the pictures into the second folder, as will be discussed in turn. For example, selection of content using the drag and drop gesture may include tapping on each additional picture while maintaining contact with at least one finger after initiating a multi-fingered drag and drop gesture, as will be apparent in light of the present disclosure.

In some embodiments, the functions performed when using a duplicate content mode as variously described herein may be configured at a global level (i.e., based on the UI settings of the electronic device) and/or at an application level (i.e., based on the specific application being displayed). To this end, the duplicate content mode may be user-configurable, hard-coded, or some combination thereof (e.g., where some aspects are user-configurable and others are hard-coded). Further, the duplicate content mode as variously described herein may be included initially with the UI (or operating system) of a touch sensitive computing device or be a separate program/service/application configured to interface with an already existing UI for a touch sensitive computing device to incorporate the functionality of the duplicate content mode as variously described herein. For ease of reference, user input (e.g., the input used for a multi-fingered drag and drop gesture) is sometimes referred to as contact or user contact. However, direct and/or proximate contact (e.g., hovering within a few centimeters of the touch sensitive surface) may be used to perform the multi-fingered drag and drop gestures as variously described herein depending on the specific touch sensitive device/interface being used. In other words, in some embodiments, a user may be able to use the duplicate content mode without physically touching the touch sensitive device, as will be apparent in light of this disclosure.

Device and Configuration Examples

Figure 1B:
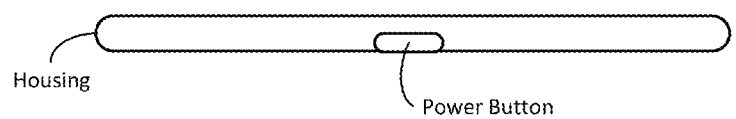

FIGS. 1a-b illustrate an example touch sensitive computing device having a duplicate content mode configured in accordance with an embodiment of the present invention. The device could be, for example, a tablet such as the NOOK® Tablet by Barnes & Noble. In a more general sense, the device may be any electronic device having a touch sensitive user interface and capability for displaying content to a user, such as a mobile phone or mobile computing device such as an eReader, a tablet or laptop, a desktop computing system, a television, a smart display screen, or any other device having a touch screen display or a non-touch display screen that can be used in conjunction with a touch sensitive surface. As will be appreciated in light of this disclosure, the claimed invention is not intended to be limited to any particular kind or type of electronic device.

As can be seen with this example configuration, the device comprises a housing that includes a number of hardware features such as a power button and a press-button (sometimes called a home button herein). A touch screen based user interface (UI) is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated. Although the touch sensitive computing device shown in FIGS. 1a-d uses a touch screen display, other embodiments may include a non-touch screen and a touch sensitive surface such as a track pad, or a touch sensitive housing configured with one or more acoustic sensors, etc. For ease of description, examples are provided with touch screen technology.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The home button may also be configured to unselect preselected content or objects, for example. Numerous other configurations and variations will be apparent in light of this disclosure, and the claimed invention is not intended to be limited to any particular set of hardware buttons or features, or device form factor.

As can be further seen, the status bar may also include a book icon (upper left corner). In some such cases, the user can access a sub-menu that provides access to a duplicate content mode configuration sub-menu by tapping the book icon of the status bar. For example, upon receiving an indication that the user has touched the book icon, the device can then display the duplicate content mode configuration sub-menu shown in FIG. 1d. In other cases, tapping the book icon may just provide information on the content being consumed. Another example way for the user to access a duplicate content mode configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with, for example, an appropriately placed screen tap) may cause the duplicate content mode configuration sub-menu of FIG. 1d to be displayed, in accordance with an embodiment. In other example embodiments, selecting the Screen/UI option may present the user with a number of additional sub-options, one of which may include a so-called duplicate content mode option, which may then be selected by the user so as to cause the duplicate content mode configuration sub-menu of FIG. 1d to be displayed. Any number of such menu schemes and nested hierarchies can be used, as will be appreciated in light of this disclosure. In other embodiments, the duplicate content mode may be hard-coded such that no configuration is needed or otherwise provided. The degree of hard-coding versus user-configurability can vary from one embodiment to the next, and the claimed invention is not intended to be limited to any particular configuration scheme of any kind, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's hand, a stylus, or some other suitable implement) in a particular location(s) into an electrical signal which is then received and processed by the underlying operating system (OS) and circuitry (processor, etc.) of the touch sensitive computing device. In some instances, note that the user need not actually physically touch the touch sensitive surface/interface to provide user input (e.g., when the touch sensitive surface/interface recognizes hovering). Additional example details of the underlying OS and circuitry in accordance with some embodiments will be discussed in turn with reference to FIG. 2a. In some cases, the duplicate content mode may be automatically configured by the specific UI or application being used. In these instances, the duplicate content mode need not be user-configurable (e.g., if the duplicate content mode is hard coded or is otherwise automatically configured).

Figure 1C:
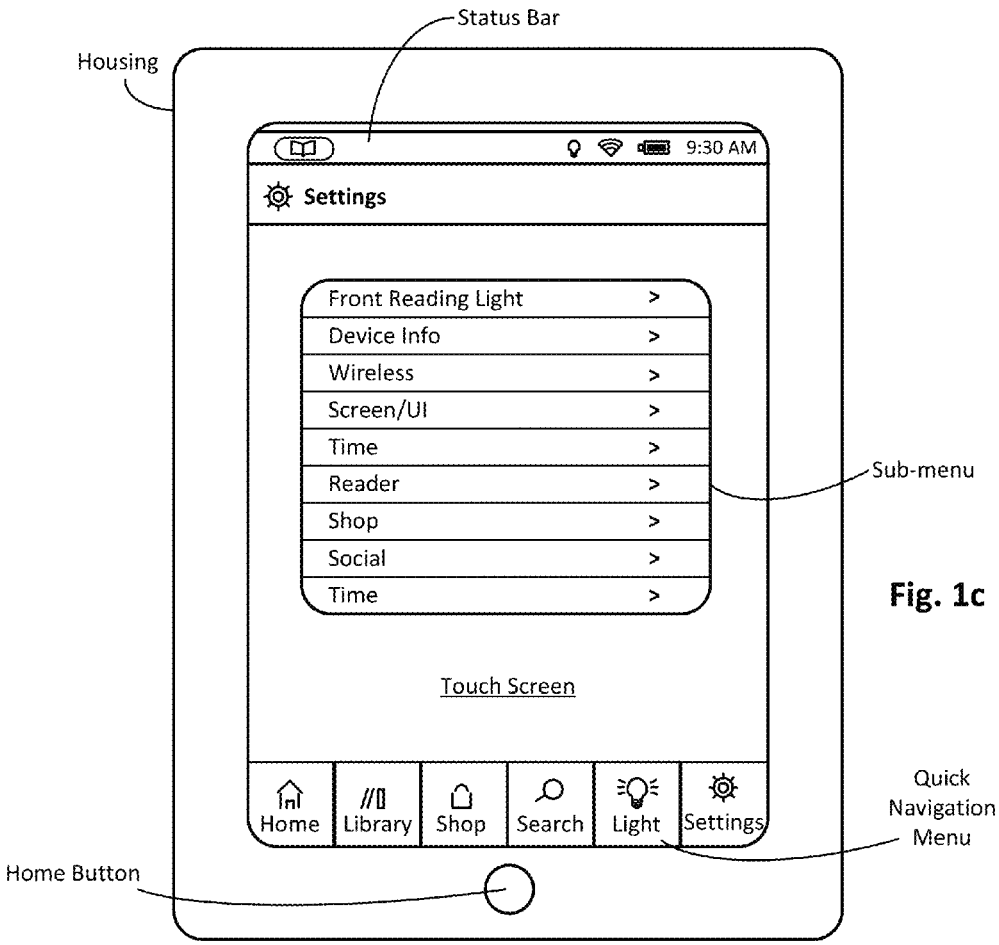
FIGS. 1c-d illustrate example configuration screen shots of the user interface of the touch sensitive computing device shown in FIGS. 1a-b configured in accordance with an embodiment of the present invention.
Figure 1D:
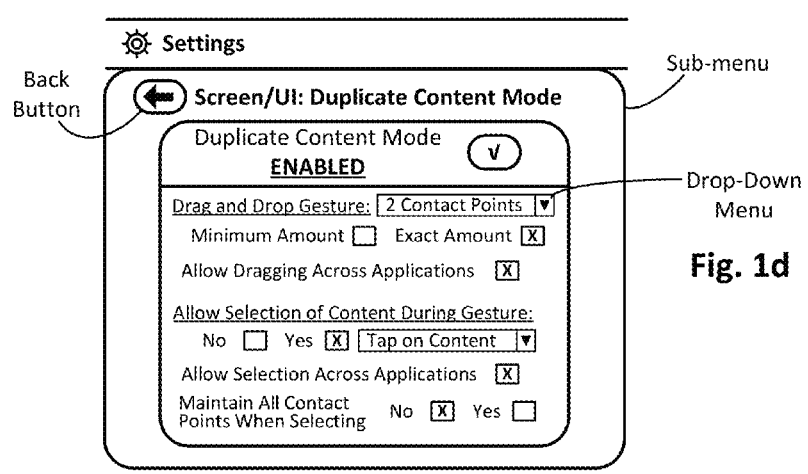

As previously explained, and with further reference to FIGS. 1c and 1d, once the Settings sub-menu is displayed (FIG. 1c), the user can then select the Screen/UI option. In response to such a selection, the duplicate content mode configuration sub-menu shown in FIG. 1d can be provided to the user. In this example case, the duplicate content mode configuration sub-menu includes a UI check box that when checked or otherwise selected by the user, effectively enables the duplicate content mode (shown in the Enabled state); unchecking the box disables the mode. Other embodiments may have the duplicate content mode always enabled, or enabled by a switch or button, for example. In some instances, the duplicate content mode may be automatically enabled in response to an action, such as when two or more objects have been selected, for example. As previously described, the user may be able to configure some of the features with respect to the duplicate content mode, so as to effectively give the user a say in, for example, when the duplicate content mode is available and/or how it is invoked, if so desired.

In the example case shown in FIG. 1d, once the duplicate content mode is enabled, the user can choose the number of contact points for the drag and drop gesture used to copy content. As previously described, the drag and drop gesture used for copying content uses multiple contact points. As shown in the drop-down menu, 2 Contact Points have been selected for the drag and drop gesture; however, the number of contact points may be set at 3 contact points, 4 contact points, etc. Further, this example case allows the user to select whether the selected number of contact points is the Minimum Amount or the Exact Amount of contact points for the drag and drop gesture (shown with the Exact Amount options selected). Another configurable option provided in this example case is whether the duplicate content mode will Allow Dragging Across Applications (shown selected/enabled). When enabled, dragging across applications may allow the user to copy content from one application to another, where suitable. For example, the user may be able to perform a multiple contact point drag and drop gesture to copy selected pictures from a photo gallery application to a document editing application to copy the pictures into the document. When dragging across applications is not enabled, the user may be able to only copy content within one application. For example, the user may be able to perform a multiple contact point drag and drop gesture within a file editing application to copy selected files from one folder to another.

Continuing with the example settings screen shown in FIG. 1d, an option allows a user to determine whether the duplicate content mode allows for the selection of content during the drag and drop gesture (i.e., the Allow Selection of Content During Gesture settings option). As shown, this setting option is enabled (i.e., Yes selected) and the drop-down menu indicates that the action for selecting content during the drag and drop gesture is a Tap on Content action. Other actions may be used for selecting content during the drag and drop gesture used for the duplicate content mode, such as stopping on the content or hovering over it for a predetermined duration, for example. Another configurable option provided in this example is whether the duplicate content mode will Allow Selection Across Applications (shown selected/enabled). When enabled, the user may be able to drag to a new application and select additional content to be copied. In this manner, the user may be able to use one gesture to select content across various applications. When selection across applications is not enabled, the user may be able to only select content within one application after initiating the multiple contact drag and drop gesture to copy content. For example, the user may be able to select multiple files in various folders within a file editing application to then copy the selected files to a target folder. Numerous configurations and features will be apparent in light of this disclosure.

In one or more embodiments, the user may specify a number of applications in which the duplicate content mode can be invoked. Such a configuration feature may be helpful, for instance, in a smart phone or tablet computer or other multi-function computing device that can execute different applications (as opposed to a device that is more or less dedicated to a particular application). In one example case, for instance, the available applications could be provided along with a corresponding check box. Example diverse applications include an eBook application, a document editing application, a text or chat messaging application, a browser application, a file manager application, or a media manager application (e.g., a picture or video gallery), to name a few. In other embodiments, the duplicate content mode can be invoked whenever one or more objects are selected (e.g., pictures, videos, notes, etc.) or when the touch sensitive surface/interface detects two or more contact points, for example. Any number of applications or device functions may benefit from a duplicate content mode as provided herein, whether user-configurable or not, and the claimed invention is not intended to be limited to any particular application or set of applications.

As can be further seen in FIG. 1d, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c and 1d show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Architecture

Figure 2A:
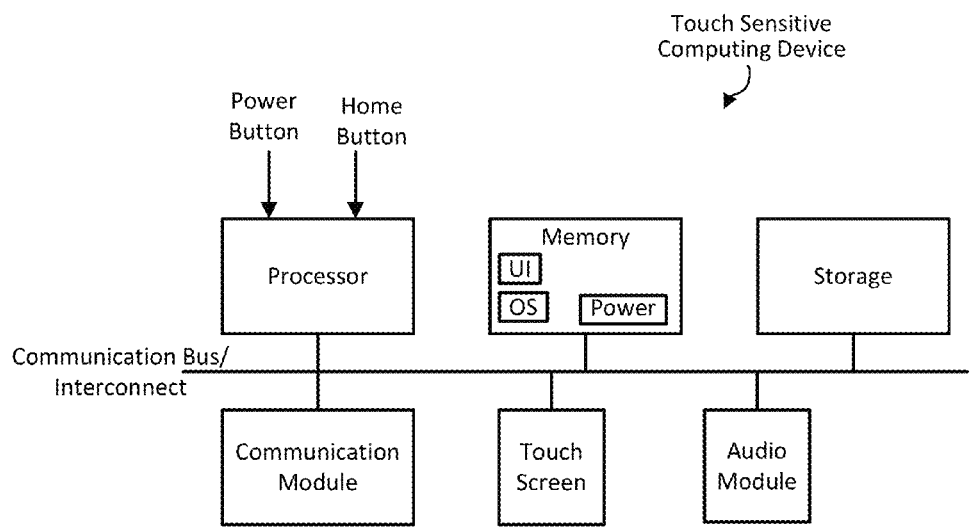
FIG. 2a illustrates a block diagram of a touch sensitive computing device configured in accordance with an embodiment of the present invention.

FIG. 2a illustrates a block diagram of a touch sensitive computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In this manner, a non-touch sensitive computing device can become a touch sensitive computing device by adding an interfacing touch sensitive component. The principles provided herein equally apply to any such touch sensitive devices. For ease of description, examples are provided with touch screen technology.

The touch sensitive surface (touch sensitive display or touch screen, in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In still other embodiments, the touch screen display may be configured with only an active stylus sensor. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch sensitive surface (such as a touch screen). Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a duplicate content mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments® OMAP3621 applications processor), and may include one or more co-processors or controllers to assist in device control. In this example case, the processor receives input from the user, including input from or otherwise derived from the power button, home button, and touch sensitive surface. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 6-inch E-ink Pearl 800×600 pixel screen with Neonode® zForce® touch screen, or any other suitable display and touch screen interface technology. The communications module can be, for instance, any suitable 802.11b/g/n WLAN chip or chip set, which allows for connection to a local network so that content can be downloaded to the device from a remote location (e.g., content provider, etc., depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc.). The device may be smaller, for example, for smart phone and tablet applications and larger for smart computer monitor and laptop applications.

The operating system (OS) module can be implemented with any suitable OS, but in some example embodiments is implemented with Google Android OS or Linux OS or Microsoft OS or Apple OS. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology, and the various example screen shots and example use-cases shown in FIGS. 1a, 1c-d, 3a-e, 4a-c, and 5a-f, in conjunction with the duplicate content mode methodologies demonstrated in FIG. 6, which will be discussed in turn. The audio module can be configured, for example, to speak or otherwise aurally present a selected eBook or other textual content, if preferred by the user. In some example cases, if additional space is desired, for example, to store digital books or other content and media, storage can be expanded via a microSD card or other suitable memory expansion technology (e.g., 32 GBytes, or higher).

Client-Server System

Figure 2B:
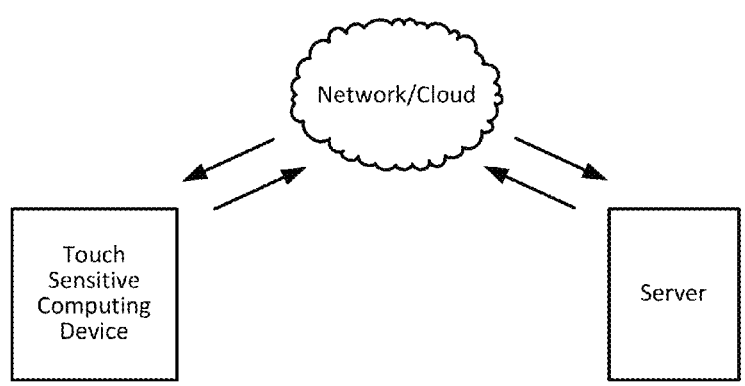
FIG. 2b illustrates a block diagram of a communication system including the touch sensitive computing device of FIG. 2a configured in accordance with an embodiment of the present invention.

FIG. 2b illustrates a block diagram of a communication system including the touch sensitive computing device of FIG. 2a, configured in accordance with an embodiment of the present invention. As can be seen, the system generally includes a touch sensitive computing device that is capable of communicating with a server via a network/cloud. In this example embodiment, the touch sensitive computing device may be, for example, an eReader, a mobile phone, a smart phone, a laptop, a tablet, a desktop computer, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by providing the user with requested or otherwise recommended content. In some such embodiments, the server may be configured to remotely provision a duplicate content mode as provided herein to the touch sensitive device (e.g., via JavaScript or other browser based technology). In other embodiments, portions of the methodology may be executed on the server and other portions of the methodology may be executed on the device. Numerous server-side/client-side execution schemes can be implemented to facilitate a duplicate content mode in accordance with one or more embodiments, as will be apparent in light of this disclosure.

Duplicate Content Mode Examples

Figure 3A:
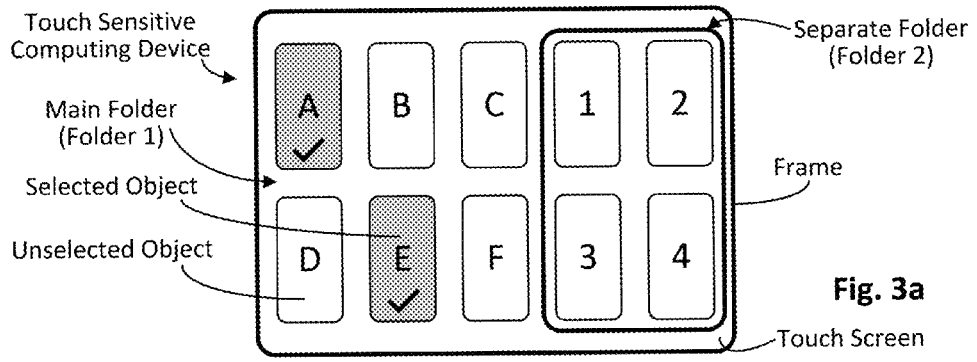
FIGS. 3a-e collectively illustrate an example duplicate content mode drag and drop gesture for copying preselected content to a target location, in accordance with an embodiment of the present invention.
Figure 3B:
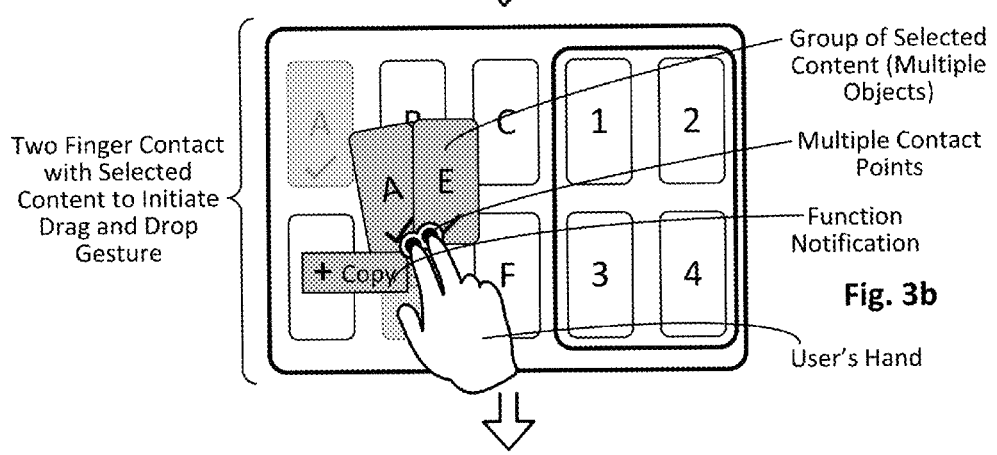
Figure 3C:
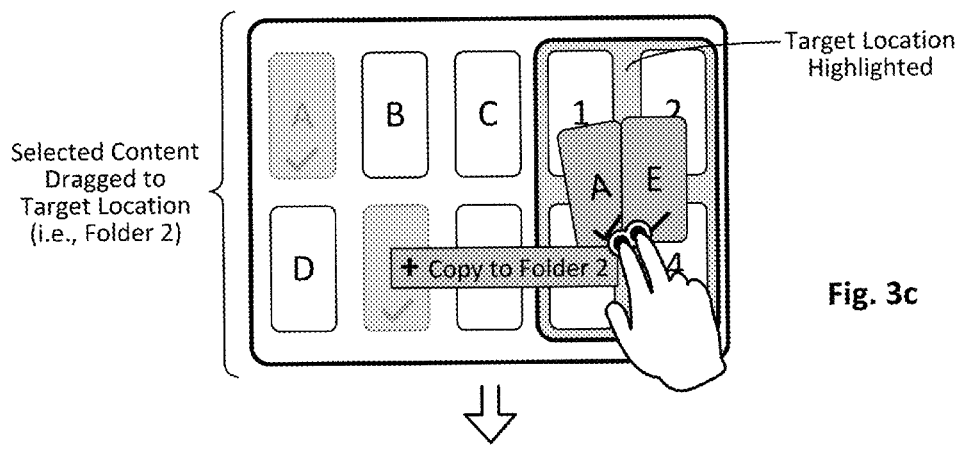
Figure 3D:
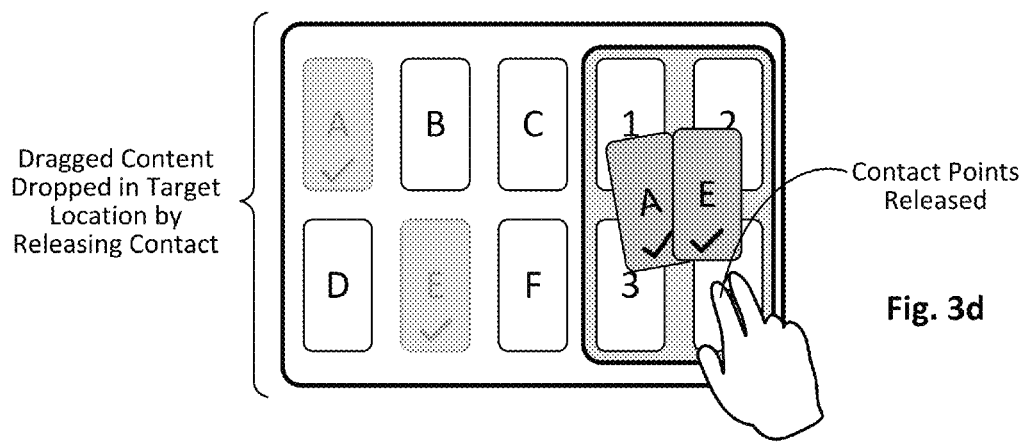
Figure 3E:
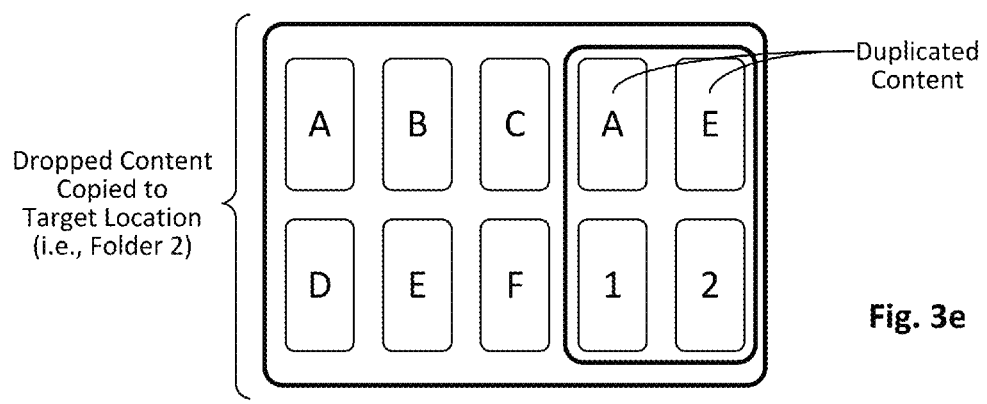

FIGS. 3a-e collectively illustrate an example duplicate content mode drag and drop gesture for copying preselected content to a target location, in accordance with an embodiment of the present invention. FIG. 3a illustrates a screen shot of an example touch sensitive computing device having a duplicate content mode configured in accordance with one or more embodiments of the present invention. The touch sensitive computing device includes a frame that houses a touch sensitive surface, which in this example, is a touch screen display. In some embodiments, the touch sensitive surface may be separate from the display, such as is the case with a track pad. As previously described, any touch sensitive surface/interface for receiving user input (e.g., via direct contact or hovering input) may be used to perform duplicate content mode drag and drop gestures as variously described herein. Generally, FIG. 3a shows selected content, FIG. 3b shows two finger contact with the selected content to initiate a drag and drop gesture, FIG. 3c shows dragging the selected content to a target location, FIG. 3d shows releasing contact to drop the dragged content in the target location, and FIG. 3e shows the dropped content copied to the target location.

Continuing with the screen shot shown in FIG. 3a, two folders are shown: a main folder (Folder 1) containing objects A, B, C, D, E, and F; and a separate folder (Folder 2) containing objects 1, 2, 3, and 4. As previously described, the content or objects that can be copied using the duplicate content mode may include files, pictures, video content, audio content, books, drawings, messages, notes, documents, presentations or lectures, pages, folders, icons, textual passages, bookmarks, calendar events, contacts, applications, services, and configuration settings, just to name a few examples. In addition, the locations and applications can vary depending on the content or objects being copied and may include folders, galleries, documents, presentations, lectures, and UI screens (e.g., home screens or desktops), just to name a few examples. In this example embodiment, objects A and E in Folder 1 have been preselected, as indicated by the objects being highlighted and having a check mark inside and near the bottom of the object. The objects may have been preselected using any number of suitable techniques, such as a press-and-hold or a two-fingered tap on one of the objects to invoke the ability to select desired objects using an appropriately placed tap on each object desired to be selected, for example. Based on this example technique, the user may have performed a press-and-hold or a two-fingered tap on object A to cause it to be a selected object as shown, followed by a tap gesture on object E to cause it to be selected as well. For completeness of description, the remaining objects shown in this screen shot are unselected (i.e., objects B, C, D, F, 1, 2, 3, and 4).

FIG. 3b shows two finger contact with the selected content to initiate a duplicate content mode drag and drop gesture. In this example embodiment, the selected content has been grouped together near the multiple contact points made between the user's hand and the touch screen. Although the contact points are shown in this and other figures for illustrative purposes, feedback (e.g., visual, aural, and/or haptic) may be provided by the touch sensitive computing device to show the position(s) of the contact point(s). The selected content may be grouped in some other manner or be represented by some visual object to show that the drag and drop gesture has been initiated. Further, an optional function notification is shown near the multiple contact points to indicate that the selected content will be copied if dragged and dropped on another location. Although the multiple contact points for this example drag and drop gesture are made using two contact points (i.e., two fingers), three or more contact points may also be used. As previously described, the contact points may be made by a user's fingers, an implement (e.g., a stylus) in combination with a user's finger(s), an implement capable of establishing two or more contact points, or multiple implements. In some embodiments, the duplicate content mode may be invoked using an implement having an activated control feature. For example, a stylus side button may be assigned to invoke the duplicate content mode, such that drag and drop gestures performed when the side button is pressed can be used to copy selected content. In addition, the drag and drop gesture is shown being initiated on the selected content (i.e., on selected object E); however, the multiple contact point drag and drop gesture may be initiated in other locations, such as anywhere in the location containing the selected content (i.e., Folder 1 in this example case), for example.

FIG. 3c shows dragging the selected content to a target location. In this example screen shot, the selected content has been dragged from Folder 1 to Folder 2 as shown. Although the user maintained multiple contact points (i.e., two fingers) while dragging to the target location as shown, in some embodiments, the user may be able to maintain contact (whether direct or proximate) using one contact point or a lower amount of contact points than used to initiate the drag and drop gesture. In other words, multiple contact points may only be needed to initiate the duplicate content mode drag and drop gesture (e.g., when making contact as shown in FIG. 3b). In addition, once the dragging has been initiated, the user may be able to drag across various locations and/or applications on the touch sensitive computing device depending on the UI and/or applications being used. For example, the user may be able to drag to another folder to the right of Folder 2 by moving to the right edge of the touch screen. Continuing with FIG. 3c, after the selected content was dragged to the target location, the function notification changed to include the target location information (i.e., Copy to Folder 2) and the target location became highlighted to indicate that the selected content will be copied to the target location if dropped, as will be discussed in reference to FIGS. 3d-e.

FIG. 3d shows releasing contact with the touch screen to drop the dragged content in the target location and FIG. 3e shows the dropped content copied to the target location (i.e., Folder 2). In some instances, the steps shown in FIGS. 3d and 3e may happen simultaneously or nearly simultaneously, such that the content is dropped in the target location as shown in FIG. 3e as soon as the drag and drop gesture is released as shown in FIG. 3d. In other instances, there may be a delay between the drop and copy steps of the duplicate content mode. Regardless of the timing between the drop of the dragged content and the copying of the content into the target location, feedback may be provided (e.g., visual, aural, and/or haptic) to indicate that the dragged content was copied into the target location. As shown in FIG. 3e, the duplicated content has been copied to the target location (i.e., Folder 2) while also remaining in its original location (i.e., Folder 1). In this example embodiment, releasing contact in the original location (i.e., Folder 1) would cause no action. In other embodiments, releasing contact in the original location can cause the selected content to be copied in that location. For example, in some such embodiments, if the user had released contact in Folder 1 after initiating the multiple contact drag and drop gesture, the preselected content would be copied into Folder 1, duplicating objects A and E within that folder.

Figure 4A:
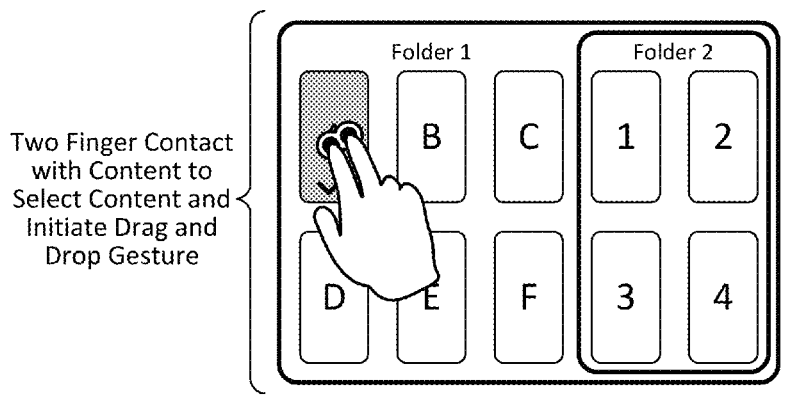
FIGS. 4a-c collectively illustrate an example duplicate content mode drag and drop gesture for copying content to a target location, in accordance with an embodiment of the present invention.
Figure 4B:
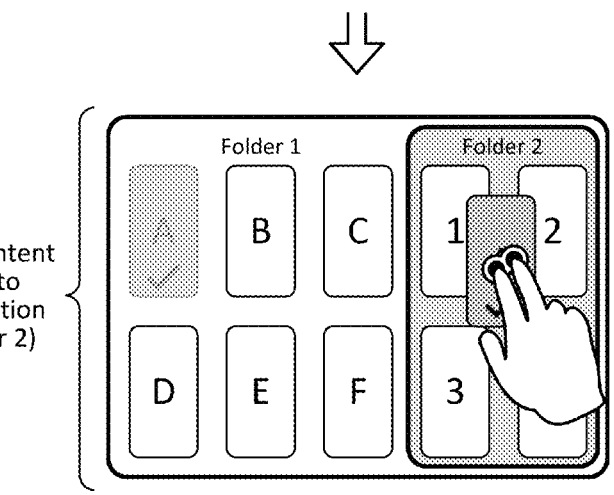
Figure 4C:
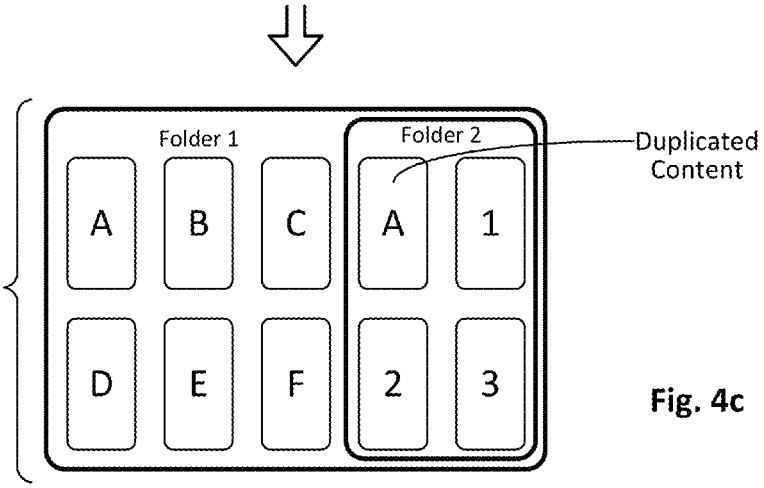

FIGS. 4a-c collectively illustrate an example duplicate content mode drag and drop gesture for copying content to a target location, in accordance with an embodiment of the present invention. FIG. 4a shows the touch sensitive computing device shown in FIG. 3a with the addition of folder labels (i.e., Folder 1 and Folder 2) but without preselected objects. In this example embodiment, the multiple contact drag and drop gesture is used to select a single object and copy it to a target location. More specifically: FIG. 4a shows two finger contact being made with the content desired to be duplicated (i.e., object A); FIG. 4b shows that object A being dragged to the target location while maintaining contact (whether direct or proximate) with the touch screen; and FIG. 4c shows the content being dropped on Folder 2 (i.e., by releasing contact) to copy it into the folder. In this manner, individual objects (or pieces of content) can be copied to a target location by initiating the multiple contact drag and drop gesture on that individual object (or piece of content). For completeness of description, the function notification is not shown in this example embodiment.

Figures 5A, 5B, 5C:
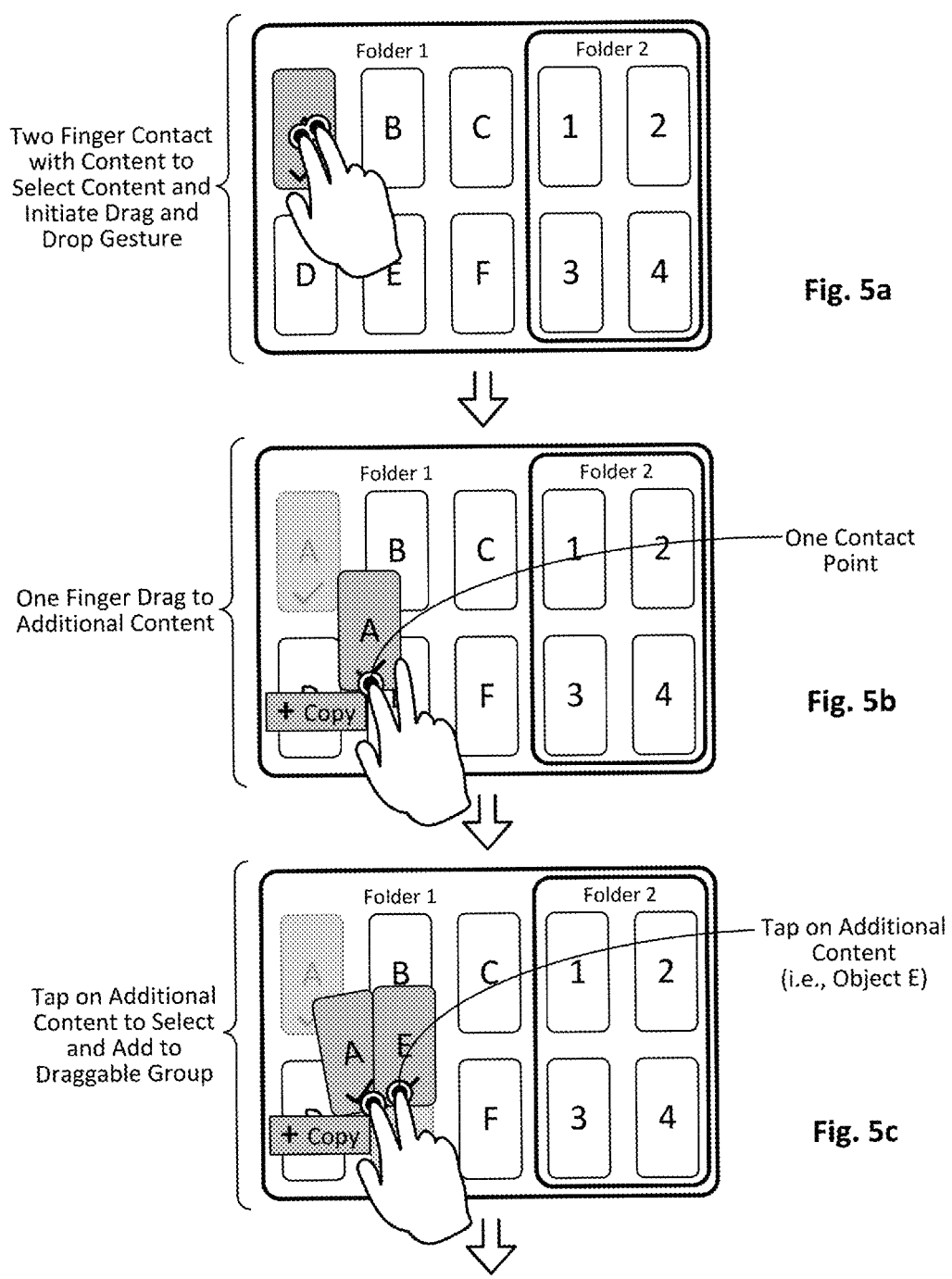
FIGS. 5a-f collectively illustrate an example duplicate content mode drag and drop gesture for selecting and copying content to a target location, in accordance with an embodiment of the present invention.
Figure 5D:
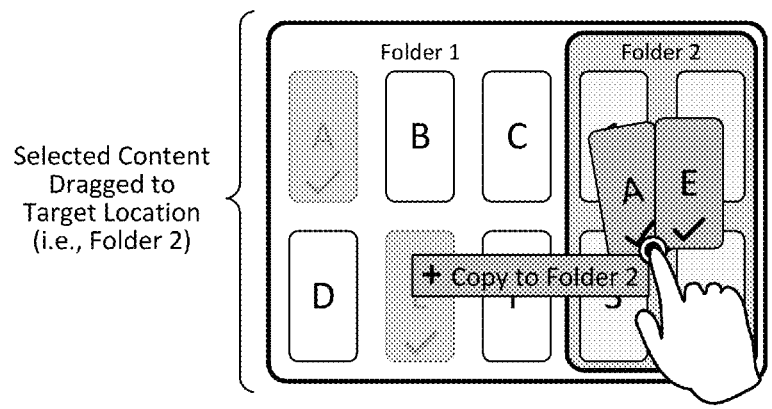
Figure 5E:
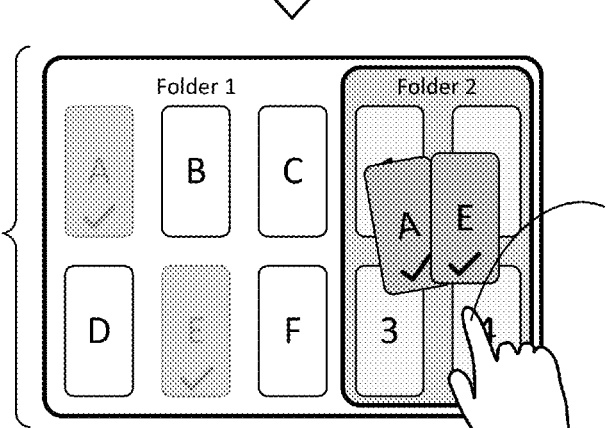
Figure 5F:
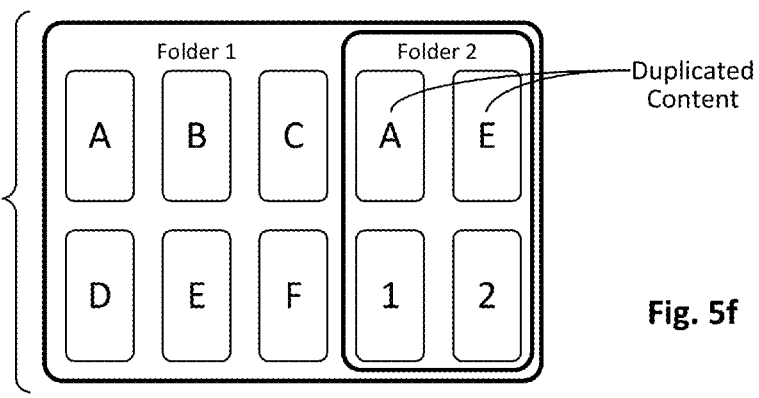

FIGS. 5a-f collectively illustrate an example duplicate content mode drag and drop gesture for selecting and copying content to a target location, in accordance with an embodiment of the present invention. FIG. 5a shows the touch sensitive computing device shown in FIG. 3a with the addition of folder labels (i.e., Folder 1 and Folder 2) but without preselected objects. In this example embodiment, the user can select addition objects (or pieces of content) by tapping on the additional objects after initiating a multiple contact drag and drop gesture. FIG. 5a shows two finger contact being made to select content (i.e., object A) and initiate the drag and drop gesture, as was performed in FIG. 4a. As previously described, in some embodiments, such as the example embodiment shown in FIGS. 5a-f, multiple contact points may be needed to initiate the duplicate content mode drag and drop gesture, but not to maintain the gesture. FIG. 5b shows a one finger drag to the location of additional content desired to be added to the group (i.e., object E). As previously described, in some embodiments, the user can select additional objects (or pieces of content) by tapping on the additional objects, for example, after initiating a multiple contact drag and drop gesture. FIG. 5c shows the user tapping on object E with the second finger (i.e., the index finger) to select it and add it to the draggable group. FIG. 5d shows the selected content dragged to the target location (i.e., Folder 2) using one finger. FIG. 5e shows the dragged content being dropped in Folder 2 by releasing contact to copy the content into Folder 2 as shown in FIG. 5f. Numerous different duplicate content mode examples and configurations will be apparent in light of this disclosure.

Methodology

Figure 6:
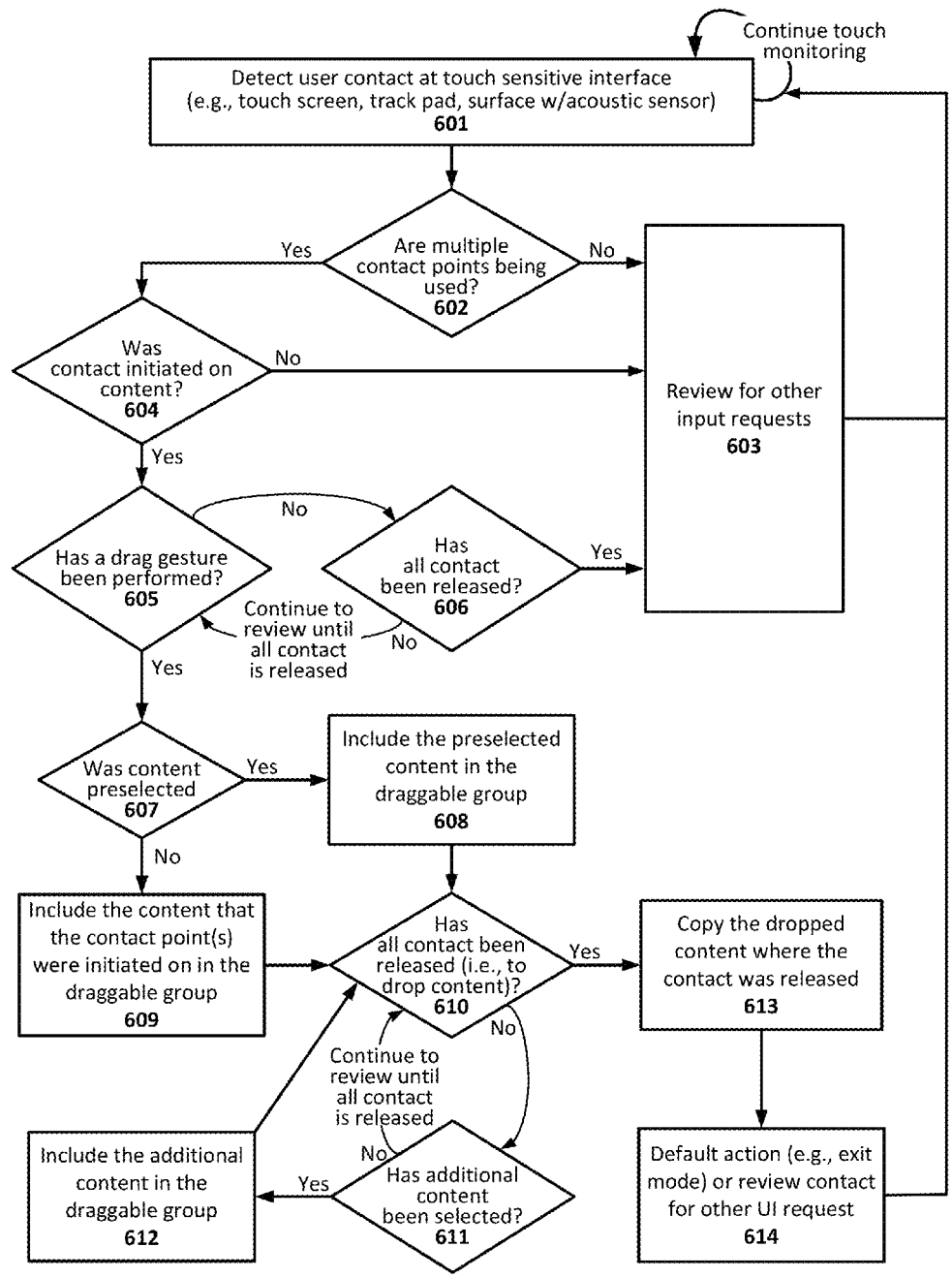
FIG. 6 illustrates a method for providing a duplicate content mode in a touch sensitive computing device, in accordance with one or more embodiments of the present invention.

FIG. 6 illustrates a method for providing a duplicate content mode in a touch sensitive computing device, in accordance with one or more embodiments of the present invention. This example methodology may be implemented, for instance, by the UI module of the touch sensitive device shown in FIG. 2a, or the touch sensitive device shown in FIG. 2b (e.g., with the UI provisioned to the client by the server).

To this end, the UI and the duplicate content mode can be implemented in software, hardware, firmware, or any combination thereof, as will be appreciated in light of this disclosure.

The method generally includes sensing a user's input by a touch sensitive surface. In general, any touch sensitive device/interface may be used to detect contact (whether direct or proximate) with it by one or more fingers and/or styluses or other suitable implements. As soon as the user begins to swipe or otherwise move the contact point(s) (i.e., starting contact point(s)), the UI code (and/or hardware) can assume a drag gesture has been engaged and track the path of each contact point with respect to any fixed point within the touch surface until the user stops engaging the touch sensitive surface. The release point can also be captured by the UI as it may be used to execute (e.g., to cause the dropped objects to be copied to the target location) or stop executing the action started when the user pressed on the touch sensitive surface. These main detections can be used in various ways to implement UI functionality, including a duplicate content mode as variously described herein, as will be appreciated in light of this disclosure.

In this example case, the method includes detecting 601 user contact at the touch sensitive interface. In general, the touch monitoring is effectively continuous. Although the method illustrated in FIG. 6 and described herein is in the context of user contact, the contact may be direct or proximate to include, e.g., hovering input. The method continues with determining 602 if multiple contact points are being used, which may be made using, for example, two or more fingers, or a stylus in combination with one or more fingers. If multiple contact points are not being used, then the method may continue with reviewing 603 for other input requests. If multiple contact points are being used, then the method may continue with determining 604 if the contact was initiated on content or one or more objects. If contact was not made with any content or objects (e.g., all contact was initiated in a blank area of the display), then the method may continue with reviewing 603 for other input requests. If some contact was initiated on content, such as an object (e.g., a picture, video, or note), then the method continues by determining 605 if a drag gesture has been performed. As previously described, the contact may be direct or proximate (e.g., using hovering input), such that the user may not have to physically contact the touch sensitive surface/interface.

Determining 605 if a drag gesture has been performed may include determining if one or more of the contact points have moved from their original locations. For example, this may include a swiping motion away from the initial contact point(s) to new locations relative to the touch sensitive surface/interface. If a drag gesture has not been performed, the method continues by determining 606 if all contact has been released. If all contact has been released before a drag gesture has been performed, the method continues by reviewing 603 for other input requests. If all contact has not been released, the method continues by reviewing to determine 605 if a drag gesture has been performed until either all contact points have been released before performing a drag gesture or a drag gesture occurs. For example, if the user simply performed a tapping gesture or a long press gesture using multiple contact points (e.g., a two finger tap), then this would not be registered as a drag and the method would continue by reviewing 603 for other input requests. However, if the user initiates contact using multiple contact points, holds that contact for any duration, and then performs a drag gesture, the method continues to step 607. As previously described, the method determines if multiple contact points initiated the contact, but multiple contact points may not have to be maintained throughout the dragging portion of the drag and drop gesture.

If a drag gesture has been performed prior to all of the contact being released, the method continues by determining 607 if content was preselected. For example, one or more objects may have been selected before multiple contact points were initiated on content, as previously described with reference to at least FIG. 3a. Continuing with the method shown in FIG. 6, if content was preselected prior to initiating the multiple contact point drag and drop gesture, then that preselected content can be included 608 in a draggable group created when the drag gesture was performed. If content was not preselected prior to initiating the multiple contact point drag and drop gesture, then only the content that one or more of the contact points were initiated on will be included 609 in a draggable group. In some instances, the draggable group may include one piece of content or one object, such as a single file, folder, or document, for example, when it is created with the drag gesture. After the initial draggable group is created by the drag gestures initiation, the method continues by determining 610 if all contact has been released (i.e., to drop the content).

If the contact has not been released to drop the group of content, the method continues by determining 611 if additional content has been selected. Determining 611 if additional content has been selected may include, for example, determining if the content was selected using a tap gesture (e.g., see FIGS. 5a-f). If additional content has not been selected, the method continues to review 610 if all contact has been released (i.e., to drop the content) or if additional content has been selected until one of the actions occurs. If additional content has been selected, the additional content is included 612 in the draggable group of content. The method continues by looping back to determine 610 if all contact has been released. Once all contact has been released (i.e., 610 is satisfied), the method continues by copying 613 the dropped content where the contact was released (i.e., into the target location). If the contact was released on the location where all of the selected content in the draggable group originated, then the content may or may not be copied in that location, depending on the configuration of the duplicate content mode.

After the content has been copied to the target location determined by the release location (i.e., the drop location), the method continues with a default action 614, such as exiting the duplicate content mode, unselecting the previously selected content (that was just copied using the duplicate content mode), or doing nothing until further user contact/input is received. Likewise, the received contact can be reviewed for some other UI request, as done at 603. The method may continue in the touch monitoring mode indefinitely or as otherwise desired, so that any contact provided by the user can be evaluated for use in the duplicate content mode if appropriate. As previously described, the duplicate content mode may be application specific, such that it is only available, enabled, and/or active when applications that use the duplicate content mode are available, enabled, and/or active. In addition, the duplicate content mode may only be available, enabled, and/or active when one or more objects have been preselected. In this manner, power and/or memory may be conserved since the duplicate content mode may only run or otherwise be available when a specific application is running or otherwise available, or when one or more object have been preselected.

Numerous variations and embodiments will be apparent in light of this disclosure. One example embodiment of the present invention provides a device including a display for displaying content to a user, a touch sensitive surface for allowing user input, and a user interface. The user interface includes a duplicate content mode that can be invoked in response to user input via the touch sensitive surface, the user input including a drag and drop gesture initiated using multiple contact points, wherein the duplicate content mode is configured to copy selected content from its original location to a target location determined by the release location of the drag and drop gesture. In some cases, the display is a touch screen display that includes the touch sensitive surface. In some cases, the drag and drop gesture is initiated using two or more contact points, but may transition to a smaller number of contact points once the gesture is initiated. In some cases, the drag and drop gesture is initiated using a stylus while one or more fingers make contact with the touch sensitive surface. In some cases, the content includes at least one of a file, a picture, video content, audio content, a book, a drawing, a message, a note, a document, a presentation, a lecture, a page, a folder, an icon, a textual passage, a bookmark, a calendar event, a contact, an application, a service, and a configuration setting. In some cases the drag and drop gesture is performed using the following sequence: initiate contact with the touch sensitive surface at multiple contact points; drag the selected content to the new location; and drop the content by releasing contact with the touch sensitive surface. In some cases, the multiple contact points used to initiate the drag and drop gesture are maintained throughout the gesture until the drag and drop gesture is released. In some cases, additional content is selectable after the drag and drop gesture has been initiated and before the drag and drop gesture has been released. In some cases, the drag and drop gesture can be performed across a plurality applications. In some cases, the duplicate content mode is user-configurable. In some cases, the device is one of a smart phone, eReader, and tablet computer.

Another example embodiment of the present invention provides a mobile computing device including a display having a touch screen interface and for displaying content to a user, and a user interface. The user interface includes a duplicate content mode that can be invoked in response to user input via the touch sensitive surface (the user input including a drag and drop gesture initiated using multiple fingers), wherein the duplicate content mode is configured to allow the selection of content after the drag and drop gesture is initiated and to copy the selected content from its original location to a target location determined by where the drag and drop gesture is released. In some cases the content is selected by tapping on unselected content after the drag and drop gesture has been initiated and before the drag and drop gesture has been released. In some cases, content can be selected across multiple applications and/or locations after the drag and drop gesture is initiated.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to invoke a duplicate content mode in a device capable of displaying content in response to user input via a touch sensitive interface of the device (wherein the user input includes a drag and drop gesture initiated using multiple contact points and configured to copy selected content to a target location determined by the release location of the drag and drop gesture), and copy the selected content to the target location after releasing the drag and drop gesture on the target location. In some cases, the drag and drop gesture is initiated using two or more contact points, but may transition to a smaller number of contact points once the gesture is initiated. In some cases, the drag and drop gesture is initiated using a stylus while one or more fingers make contact with the touch sensitive surface. In some cases, the content includes at least one of a file, a picture, video content, audio content, a book, a drawing, a message, a note, a document, a presentation, a lecture, a page, a folder, an icon, a textual passage, a bookmark, a calendar event, a contact, an application, a service, and a configuration setting. In some cases, the duplicate content mode is configured to allow the selection of unselected content after the multiple contact drag and drop gesture has been initiated and before the drag and drop gesture has been released. In some such cases, content selection is performed by tapping unselected content after the multiple contact drag and drop gesture has been initiated.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
a display for displaying content to a user;
a touch sensitive surface for allowing user input; and
a user interface including a duplicate content mode that can be invoked in response to user input via the touch sensitive surface, the user input including a drag and drop gesture initiated using multiple contact points, wherein the duplicate content mode is configured to copy selected content from its original location to a target location determined by the release location of the drag and drop gesture, and wherein the duplicate content mode is further configured to allow the drag and drop gesture to transition to a smaller number of contact points after the gesture is initiated.

2. The device of claim 1 wherein the display is a touch screen display that includes the touch sensitive surface.

3. The device of claim 1 wherein the drag and drop gesture is initiated using three or more contact points.

4. The device of claim 1 wherein the drag and drop gesture is initiated using a stylus while one or more fingers make contact with the touch sensitive surface.

5. The device of claim 1 wherein the content includes at least one of a file, a picture, video content, audio content, a book, a drawing, a message, a note, a document, a presentation, a lecture, a page, a folder, an icon, a textual passage, a bookmark, a calendar event, a contact, an application, a service, and a configuration setting.

6. The device of claim 1 wherein the drag and drop gesture is performed using the following sequence:
initiate contact with the touch sensitive surface at multiple contact points;
drag the selected content to the new location; and
drop the content by releasing contact with the touch sensitive surface.

7. The device of claim 1 wherein additional content is selectable during the drag and drop gesture.

8. The device of claim 7 wherein the additional content is selected by tapping on unselected content after the drag and drop gesture has been initiated and before the drag and drop gesture has been released.

9. The device of claim 1 wherein the drag and drop gesture can be performed across a plurality of applications, such that the selected content is from a first application and the duplicate content mode allows the selected content to be copied to a target location within a second application different than the first application.

10. The device of claim 1 wherein the duplicate content mode is user-configurable.

11. The device of claim 1 wherein the device is one of a smart phone, eReader, and tablet computer.

12. A mobile computing device, comprising:
a display having a touch screen interface and for displaying content to a user; and
a user interface including a duplicate content mode that can be invoked in response to user input via the touch sensitive surface, the user input including a drag and drop gesture initiated on content using multiple fingers, wherein the duplicate content mode is configured to allow the selection of additional content while the drag and drop gesture is maintained and to copy the selected content from its original location to a target location determined by where the drag and drop gesture is released.

13. The device of claim 12 wherein the content is selected by tapping on unselected content after the drag and drop gesture has been initiated and before the drag and drop gesture has been released.

14. The device of claim 12 wherein content can be selected across multiple applications and/or locations after the drag and drop gesture is initiated.

15. A computer program product comprising a plurality of instructions non-transiently encoded thereon to facilitate operation of an electronic device according to the following process, the process comprising:
in response to user input via a touch sensitive interface of a device capable of displaying content, invoke a duplicate content mode in the device, wherein the user input includes a drag and drop gesture initiated using multiple contact points and configured to copy selected content to a target location determined by the release location of the drag and drop gesture; and
copy the selected content to the target location after releasing the drag and drop gesture on the target location;
allow the drag and drop gesture to transition to a smaller number of contact points after the gesture is initiated.

16. The computer program product of claim 15 wherein the drag and drop gesture is initiated using three or more contact points.

17. The computer program product of claim 15 wherein the drag and drop gesture is initiated using a stylus while one or more fingers make contact with the touch sensitive surface.

18. The computer program product of claim 15 wherein the content includes at least one of a file, a picture, video content, audio content, a book, a drawing, a message, a note, a document, a presentation, a lecture, a page, a folder, an icon, a textual passage, a bookmark, a calendar event, a contact, an application, a service, and a configuration setting.

19. The computer program product of claim 15 wherein the duplicate content mode is further configured to allow the selection of unselected content while the drag and drop gesture is maintained.

20. The computer program product of claim 19 wherein content selection is performed by tapping unselected content after the multiple contact drag and drop gesture has been initiated.

* * * * *